United States Patent [19]

Edwards

[11] 4,242,109
[45] Dec. 30, 1980

[54] AIR CLEANER AND HUMIDIFIER

[76] Inventor: John W. Edwards, 8220 Doe Ave., Visalia, Calif. 93277

[21] Appl. No.: 53,355

[22] Filed: Jun. 29, 1979

[51] Int. Cl.³ .............................................. B01D 47/08
[52] U.S. Cl. ....................................... 55/230; 261/88; 55/257 NP
[58] Field of Search ......................... 55/230, 392–396, 55/257 MP; 261/90, 88

[56] References Cited

U.S. PATENT DOCUMENTS

| | | | |
|---|---|---|---|
| 714,381 | 11/1902 | Koelkebeck | 55/396 |
| 911,802 | 2/1909 | Baldwin | 261/90 |
| 1,098,389 | 6/1914 | Lister | 261/88 |
| 1,641,995 | 9/1927 | Schobrone | 261/90 |
| 1,691,827 | 11/1928 | Schuckher | 261/88 |
| 1,792,909 | 2/1931 | Iscra | 261/88 |
| 2,203,835 | 6/1940 | Minor | 55/230 |
| 2,604,185 | 7/1952 | Johnstone et al. | 55/237 |
| 3,020,974 | 2/1962 | Hungate | 55/230 |
| 3,802,162 | 4/1974 | Deane | 55/230 |
| 4,065,274 | 12/1977 | Langlois | 55/230 |

FOREIGN PATENT DOCUMENTS

| | | | |
|---|---|---|---|
| 204857 | 10/1923 | United Kingdom | 261/90 |
| 583196 | 12/1946 | United Kingdom | 261/90 |

*Primary Examiner*—Tim R. Miles

[57] ABSTRACT

The present invention relates generally to apparatus for the cleansing and humidification of particulate laden air, and comprises means for receiving particulate laden air and generating a vortical flow pattern, apparatus for injecting water vapor into said flow pattern whereby the water vapor impregnates the particulate causing the same to be centrifuged from the air flow, means for decelerating and interrupting the vortical flow to thereby remove additional particulate and excess moisture therefrom, and a collector for receiving excess moisture and particulate removed from the air.

7 Claims, 4 Drawing Figures

AIR CLEANER AND HUMIDIFIER

BACKGROUND OF THE INVENTION

Air quality is a subject of major concern in a wide variety of industries. The control of particulate matter picked up and carried by air in enclosed working areas is of particular concern to the employer as well as to the employees working in a particulate laden environment. While there are a wide variety of pollutants which are indigenous to various industries, the present invention concerns itself primarily with what may be termed broadly as dust, but which is found to be prevalent in many agricultural processes such as cotton ginning, milling and the like. Apparatus for scrubbing and treating gasses has become virtually an industry unto itself. Devices such as huge air bags which filter exhaust air have been developed at high cost, but their size and cost of operation relative to the amount of exhaust gas they are capable of handling has made them prohibitive in some industries. Along with the dust problem is the problem of humidity which in many industries must be maintained at a pre-determined level not only for employee comfort, but to minimize static electricity and other problems attendant low-humidity air.

It has been recognized as far back as 1952 in the Johnstone et al. U.S. Pat. No. 2,604,185, that by injection of a fluid such as water into an air stream, a certain amount of particulate will absorb the moisture and the added weight will result in its being dispersed from the air stream. Others, such as Deane, in his U.S. Pat. No. 3,802,162 have recognized the value of centrifuging moisture laden particulate out of an air stream moving through the system. Apparatus such as that of Dean, however, use large volumes of water, in the neighborhood of 30 gallons per minute, and involve highly complex multi-stage, high energy demand systems which complicate and add to the expense of the system without increasing its efficiency.

The apparatus of the present invention makes use of many of the previously recognized physical principals in the development of a simple yet highly effective scrubbing device having a single scrubbing chamber, including a longitudinal opening for removal of scrubbed particulate from the chamber and further employing a means of interrupting flow from the chamber to bring about a final or second stage removal of particulate and excess moisture without any type of filtering device. As a result, through the use of controlled water injection and a unique means of generating moisture particles, the air passing through the chamber, which is relatively small in size, is effectively cleansed and humidified to provide optimum atmospheric and environmentally acceptable discharge air.

BRIEF DESCRIPTION OF THE DRAWING

Having thus briefly summarized the invention, reference may not be had to the drawing wherein.

DESCRIPTION OF THE PREFERRED EMBODIMENT

Figure 1:
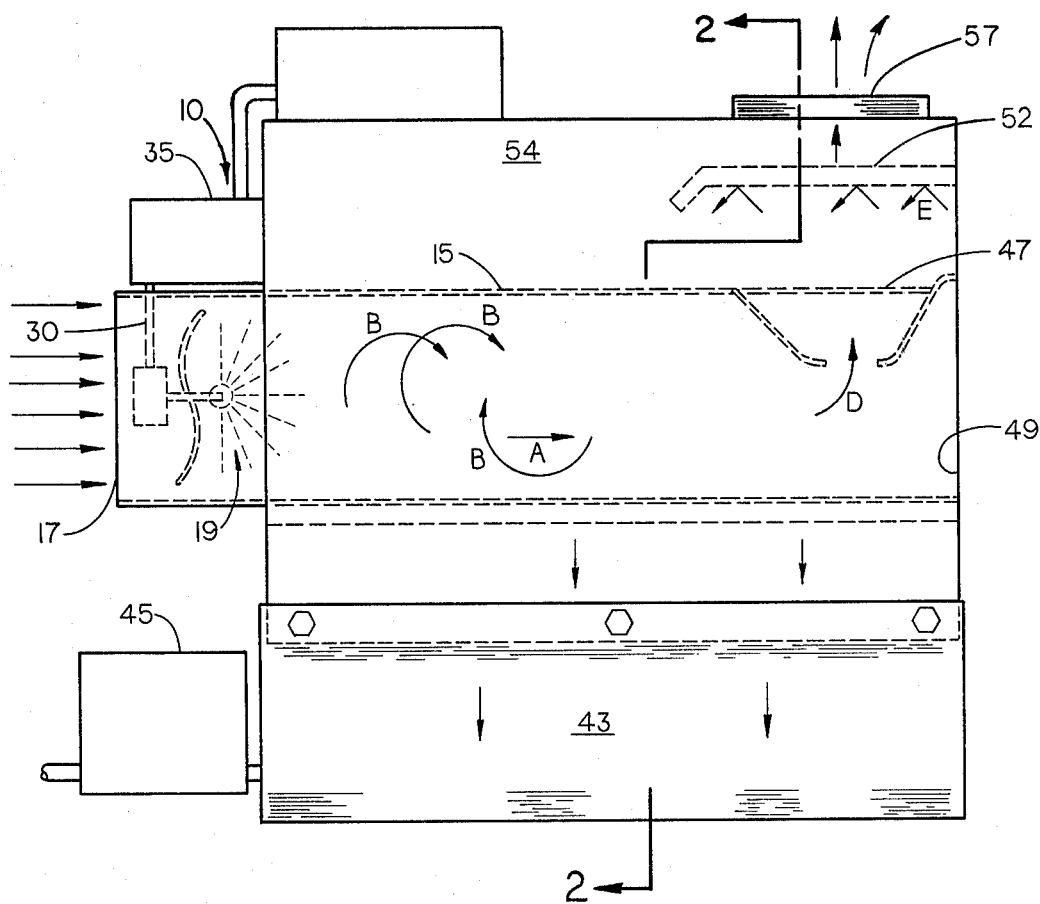
FIG. 1 is a side elevation of a device constructed in accordance with the present invention, sectioned to illustrate the operative relationship of the various parts.
Figure 3:
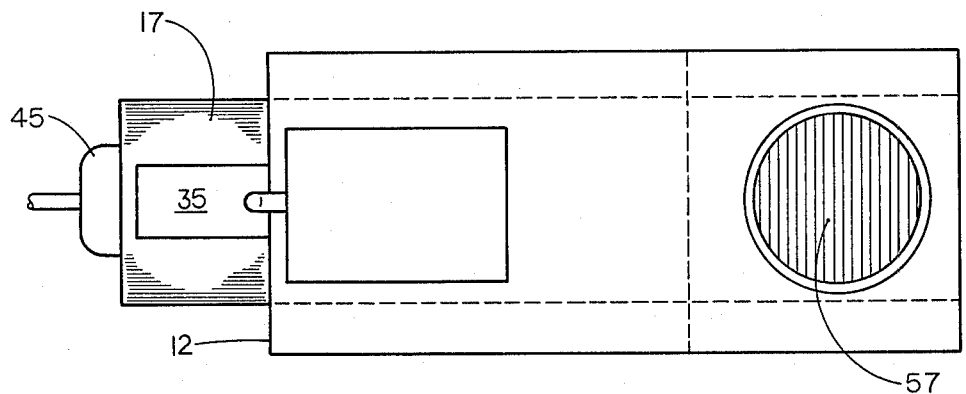
FIG. 3 is a top plan view of the device of FIG. 1.
Figure 2:
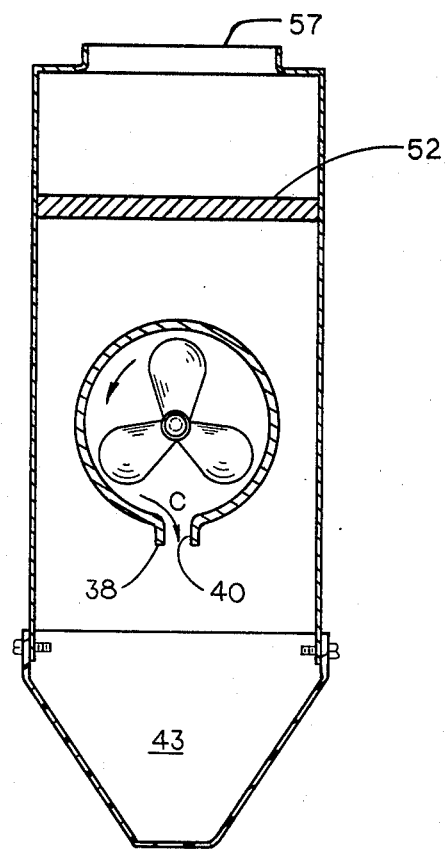
FIG. 2 is a partial sectional view of FIG. 1 taken along line 2—2.

With reference now to the drawings, and in particular to FIG. 1 thereof, there is shown an apparatus indicated generally at 10 constructed in accordance with the present invention and comprising a housing 12 through which particulate laden air is forced for the purposes of scrubbing and humidifying the same. Within the housing there is provided a tubular member 15 which, as may be seen in FIG. 1, extends the length of the housing 10 and is essentially horizontal in attitude.

Air is drawn into the tubular member 15 through an inlet 17 by means of a fan indicated generally at 19. The fan is so constructed as to drive the air axially in the direction A through the tube while at the same time generating vortical flow as indicated by the arrows B.

Figure 4:
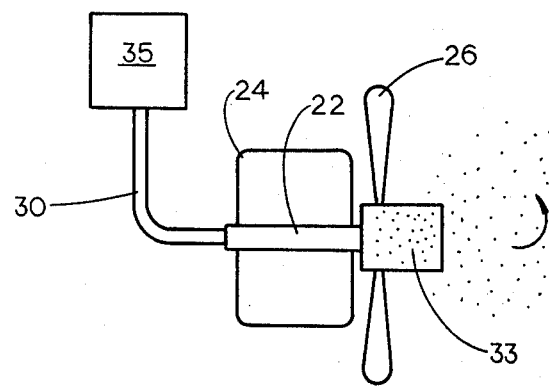
FIG. 4 is a schematic depiction of the combined air movement and water injection system of the present invention.

As may be seen in FIGS. 1 and 4, a drive shaft 22 is a part of a motor 24, in the present case, hydraulically driven, which drives the impeller blades 26. The shaft 22 is in reality a tube which is fed by a water line 30 through which water flows into a dispersion device 33 attached at the end of the shaft and rotatable therewithin. The water flow passing through the rotating device is broken up into millions of minute droplets of relatively uniform size by rotation of the fan, resulting in a "fogging" of air being moved by the blades 26. The water droplets tend to impregnate the drier particulate matter entrapped in the vortical air flow and as a consequence, the moistened particulate becomes heavy. The vortical flow tends to centrifuge the heavier particles towards the inner wall of the chamber 15 where they tend to stick and form a slurry of moist particulate matter.

The degree of saturation may, in accordance with the present invention, be controlled by the speed of the fan and the amount of water injected. It has been found that water droplet size may be controlled in this fashion and for that purpose, a flow regulator 35, of known construction is provided.

The slurrey will form on the inner wall of the chamber throughout its length and as build-up becomes significant, air movement and gravity will cause the slurrey to move down the walls as shown by the arrow C in FIG. 2. In order to permit the slurrey to be scavenged from the chamber, a slot or opening 38 is formed longitudinally along the lower extremity of the chamber 15. The opening 38 is defined by a sharply vertical surface 40 which encourages discharge of heavier elements of the slurrey from the chamber. Additionally, the vertical surface 40 serves the purpose of providing a knife-like edge resulting in a sheeting effect in that as the outer extremity of the vortical flow, which contains a majority of the heavier moisture laden particulate moves past the slot, the combination of centrifugal and gravitational forces cause the particulate to impinge upon the vertical surface 40 of the slot thereby sheering or cutting away a portion of the particulate matter and discharging it downwardly.

In order that the slurrey might be collected and eventually removed from the housing in order to permit continuous operation, a trough 43 is disposed beneath the tubular cylinder 15 where the particulate slurrey is collected and periodically removed by a pumping system 45 of known construction.

While the vortical flow in the chamber 15 results in major scrubbing of the inlet air, some of the lighter particles still entrapped in the air flowing peripherally about the inner wall of the tubular cylinder 15 are, in accordance with the invention, discharged upwardly through a discharge funnel 47. When the vortical flow reaches the end of the chamber 49 it is, of course, stopped and an air cushion developes which results in air being forced upwardly through a vertically disposed funnel 47 in the direction of the arrow D. The discharge funnel 47 is shaped to permit the volume of discharged air to expand rapidly with the resultant decrease in its velocity and attendant decrease in its ability to support wetted particulate matter. This air tends to retain some of the swirling motion developed in the chamber 15 and it has been found that disrupting the motion of the air and causing it to decelerate, a substantial portion of the remaining moistened particulate still entrapped in the air flow, will become separated from it. Accordingly, and in keeping with this aspect of the invention, a turbulator device 52 is provided which deflects the air generally seen by arrows E, thereby disrupting and turbulating the flow of the air. At the same time, the air which had been confined in the chamber 15 and had thus developed a certain amount of pressure, as it moved longitudinally towards the funnel 47 is permitted to expand into the plenum area 54 which is formed by the housing disposed about the tubular cylinder 15. As a consequence, much of the remaining moistened particulate in the air, along with excess moisture in the form of water droplets, tends to fall out of the air, about the tube 15 and into the collector trough 53. The scrubbed and humidified air is then discharged through opening 57 and may be pumped, by any known means, back into the environment from which it came, or it may be discharged to exhaust if that is desirable.

Accordingly, a highly efficient, readily controlled scrubbing apparatus is provided which includes a humidifying feature to thereby provide environmentally acceptable atmosphere automatically. For example, a seven and one-half horsepower motor in the environment of the present invention can move as much as 8,000 cubic feet of air per minute, and effectively remove dust and humidify with, in many cases, as little as one-quarter gallon of water per minute.

Having thus described the preferred embodiment of the invention, what is claimed is:

1. Apparatus for cleaning particulate laden air and humidifying the same comprising a housing, means defining a tubular chamber extending longitudinally of said housing, a fan disposed at one end of the chamber, motor means, including a rotating shaft for driving said fan, said fan mounted on said shaft and disposed at one end of said chamber for pulling particulate laden air into said chamber, and for moving said air in a vortical flow pattern through said chamber, means disposed on such shaft forward of said fan and at the center of the vortex generated thereby for injecting water vapor into said vortical flow for wetting the particulate in said air flow thereby causing the particulate to be forced outwardly and against the walls of the chamber, means defining a longitudinal slot in the bottom of said chamber to permit moisture laden particulate scrubbed from the air flow to be gravitationally dispersed from said chamber, means defining a vertically disposed discharge funnel near the end of the chamber remote from said fan for permitting discharge of air from said chamber, means for deflecting the flow of said discharged air to further decelerate the same, thereby causing additional particulate matter and moisture to be removed therefrom, a collector defined at the base of said housing for collecting excess moisture and particulate, an outlet means formed in said housing for permitting the discharge of cleansed and humidified air therefrom.

2. The apparatus as set forth in claim 1 wherein control means is provided for adjusting the volume of water injected into said vortical air flow stream.

3. The apparatus of claim 1 wherein said means defining a slot includes a vertical surface adapted to cut heavier particulate elements out of the air for discharge into said collector.

4. The apparatus of claim 1 wherein pumping means is included for removal of slurrey from said collector.

5. The apparatus of claim 1 wherein means defining a dispersion is attached to, and rotatable with said fan, said water vapor being discharged through said dispersion device for breaking said water vapor into particles of minute size.

6. The apparatus of claim 5 wherein said motor is hydraulic and said shaft is hollow so as to permit water to be injected through said shaft into said dispersion device.

7. The apparatus of claim 5 wherein water is injected into said shaft at the rate of no more than one-half gallon per minute per 8,000 cubic feet per minute air flow past said fan.

* * * * *